INVENTOR.
JOHN J. MADIGAN

July 11, 1961
J. J. MADIGAN
2,992,332
METHOD AND APPARATUS FOR DETERMINING THE QUANTITATIVE
RELATIONSHIP OF COMPONENTS IN PRODUCTS BY MEASUREMENT
OF GAMMA RAY PENETRATION THEREOF
Filed Oct. 31, 1956
5 Sheets-Sheet 2
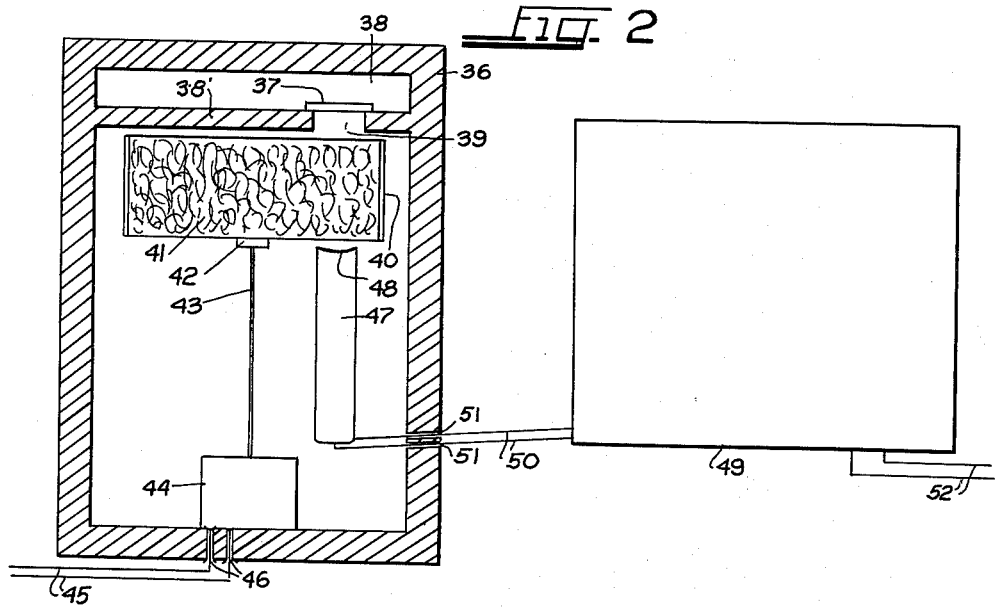
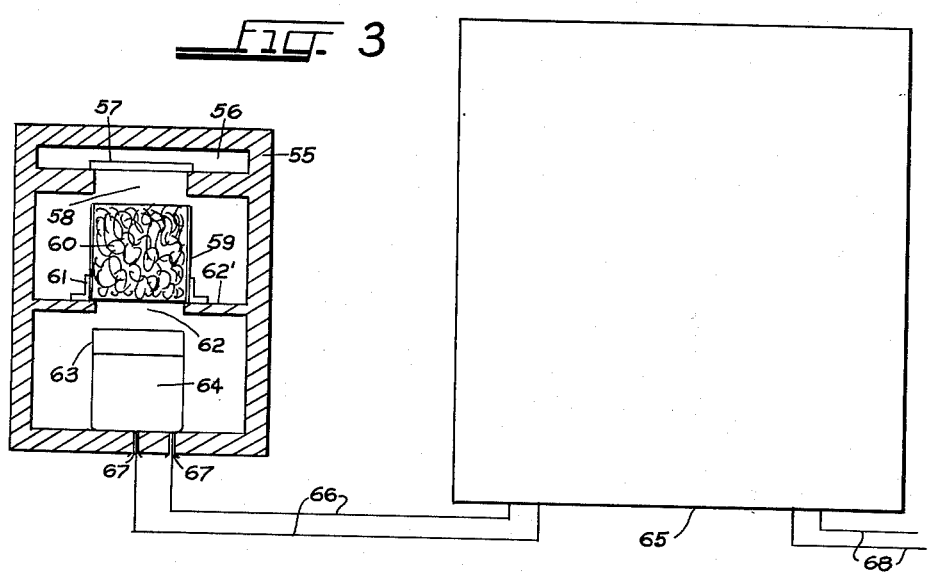
INVENTOR.
JOHN J. MADIGAN
BY
Atty,

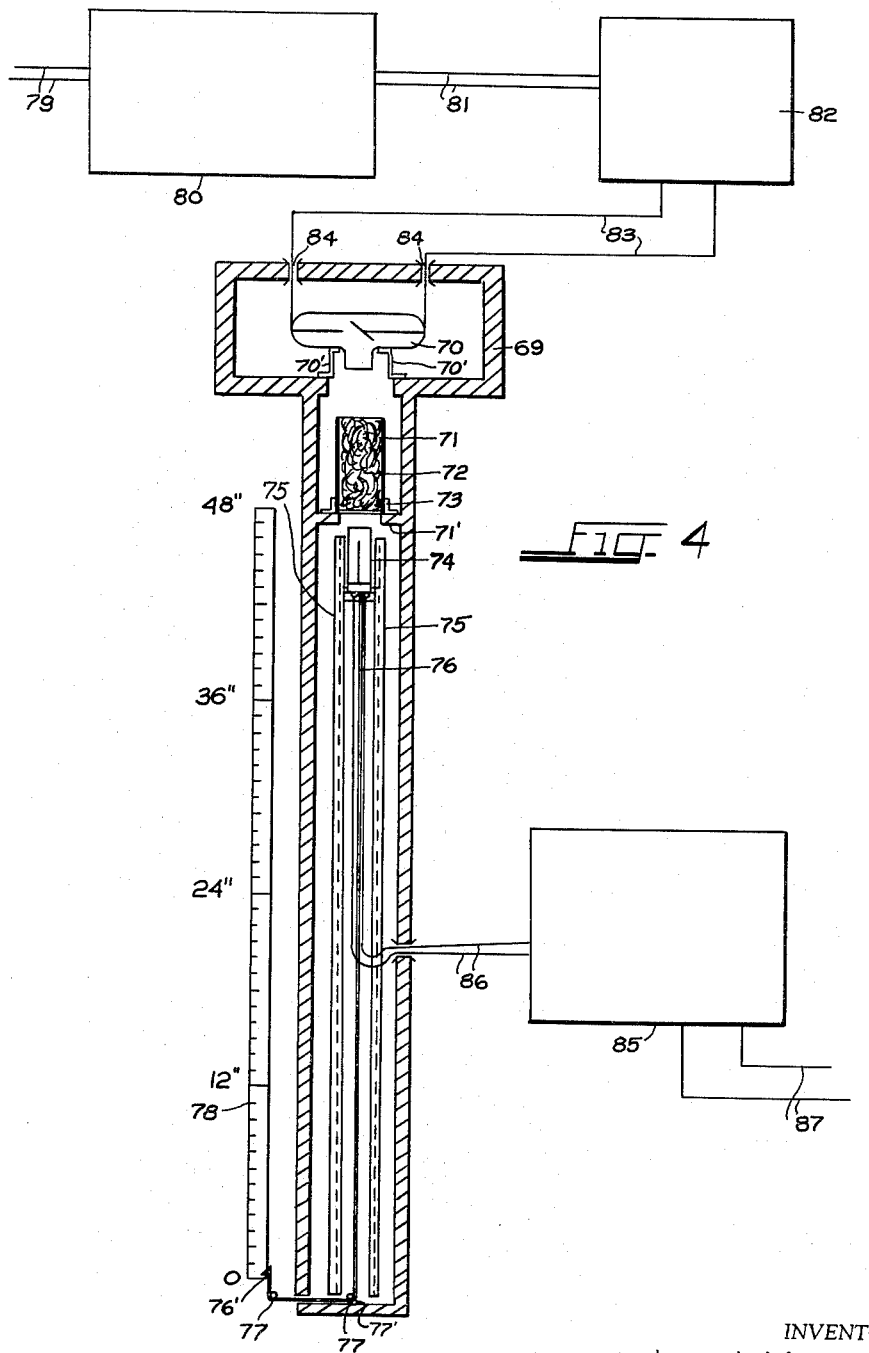

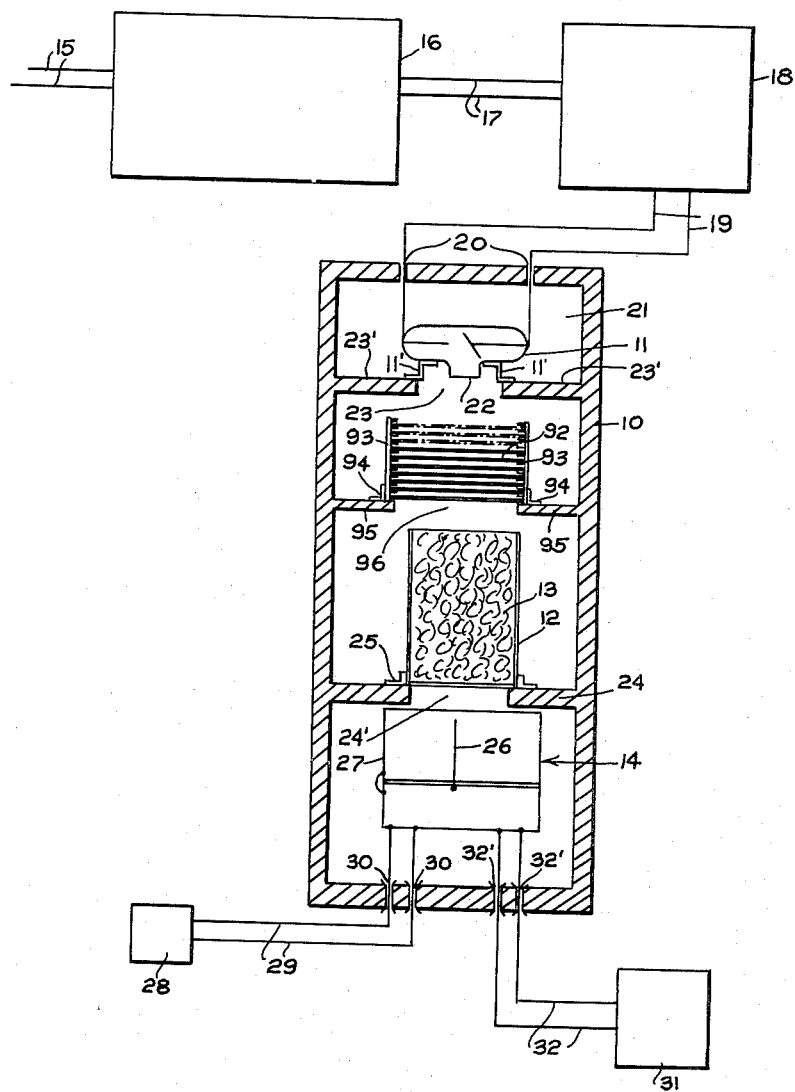

INVENTOR.
JOHN J. MADIGAN

2,992,332
METHOD AND APPARATUS FOR DETERMINING THE QUANTITATIVE RELATIONSHIP OF COMPONENTS IN PRODUCTS BY MEASUREMENT OF GAMMA RAY PENETRATION THEREOF

John J. Madigan, 411 S. 84th St., Omaha 14, Nebr.
Filed Oct. 31, 1956, Ser. No. 619,532
15 Claims. (Cl. 250—83.3)

My invention relates to a method and apparatus for determining the quantitative relationship of components in a product composed chiefly of two components, each of which is reasonably uniform, yet differing from the other, in atomic structure.

More specifically, my invention relates to a method for determining such quantitative relationship of the components in products, whether organic or inorganic, by measuring gamma radiation penetrating therethrough of critical strength in relation to the thickness and type of a test sample of the product. My method may be used to determine, for example, the relationship of lean to fat in meat; of butterfat to other components in milk; of solvent to solute in solutions, provided the atomic structure of each differs; of oil to other components in soy beans and cotton seeds; of protein to bone and ash in tankage; and of impurities and extraneous matter to other components in other homogeneous material.

An important commercial advantage of the invention is that it enables manufacturers and producers to obtain a uniform product with optimum component relationships. For example, manufacturers of meat products should be able to determine the percentage of fat in meat samples. In sausage, canned meats, etc. a certain fat content is optimum from the standpoint of cost, appearance and taste and compliance with governmental regulations. Because of the lack of satisfactory testing methods, manufacturers often use a "safe" formula, even though it is more costly (since fat is cheaper than lean) and may be less desirable with respect to appearance, flavor, etc. This long-existing problem is solved by the accurate testing method of my invention.

The gamma rays employed in my method are preferably of a strength under 50,000 electron volts which are sometimes referred to as grenz rays or soft gamma rays.

One of the objects of my invention is to provide a method for determining the quantitative relationship of components in products such as those above-mentioned without destroying or physically changing the sample used.

Another object of my invention is to provide a method for determining the quantitative relationship of components in such products by comparing the amount of gamma ray penetration through a test sample of such a product to the amount of such penetration through control samples in which the quantitative relationship of the components is known.

Still another object of my invention is to provide a method of determining the quantitative relationship of components in such products by use of gamma or grenz rays, of critical strength in relation to the mass and type of the product being tested. This may be accomplished by comparing the amount of electrical potential necessarily supplied to an X-ray tube to obtain a given amount of penetration through a test sample of the product to the electrical potential supplied to an X-ray tube to obtain a given amount of penetration through control samples in which the component relationship was known.

A further object of my invention is to provide a method of determining the quantitative relationship of such products as above described, by comparing the distance a detecting device for detecting gamma ray penetration needs to be removed from a test sample in order to obtain a given reading on a ray-detecting device to the distances said detecting device was removed from control samples in which the component relationship was known to obtain the given reading.

Still a further object of my invention is to provide a method of determining the quantitative relationship of such products as hereinbefore explained, by comparing the number or thickness of filters necessarily inserted between a source of gamma rays and a ray-detecting device when a test sample is being exposed to gamma rays, in order to obtain a given count or amount on the ray-detecting device, to the number or thickness of filters inserted between the source and the detecting device when control samples, in which the component relationship was known, were exposed to gamma radiation of the same intensity.

Yet another object of my invention is to provide a method for determining the quantitative relationship of components in a product of the above-described character which allows for the rapid determination of the relationship of the components in samples much larger than those commonly used for chemical or other types of analyses and which does not ordinarily involve a great deal of preparation of the samples to be tested.

The invention also resides in part in the apparatus which has been devised for the practice of the several variations of the method herein described.

Other objects and advantages of my invention will be apparent from the following description thereof, taken in connection with the accompanying drawings, in which:

FIG. 2 is a similar view of a modification, showing the use of a radioactive isotope as a source of gamma rays and a Geiger-Müeller tube and rate meter for measuring penetration;

FIG. 3 is a like view of a further modification showing the use of a radioactive isotope as a source of gamma rays and a scintillation crystal, photo-multiplier tube and scaler for measurement of rays after penetration;

Figure 1:
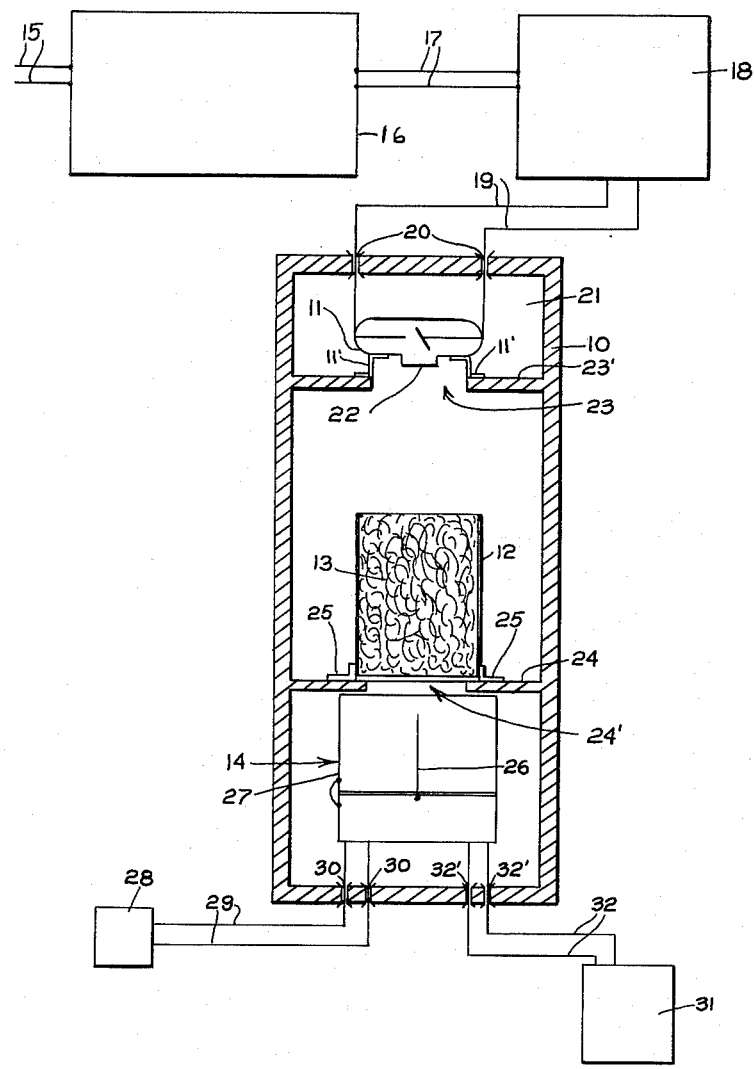
FIG. 1 is a diagrammatic view, partially in cross section, of an apparatus by which my invention may be practiced, using an X-ray tube as a source of gamma rays and an ionization chamber and electrometer for measuring penetration.
Figure 6:
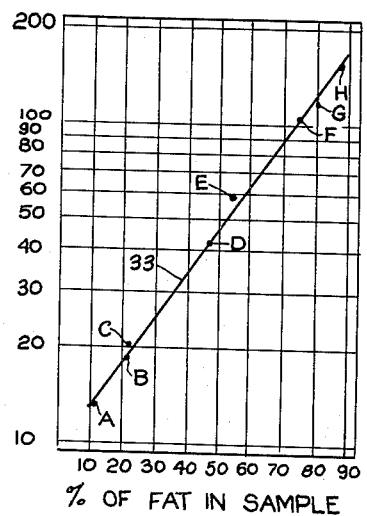
Figure 7:
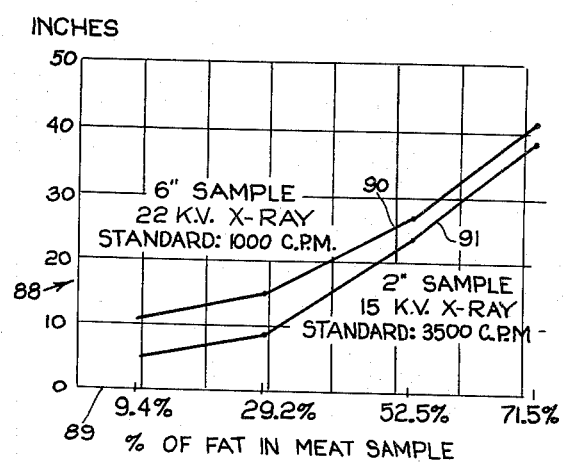
Figure 8:
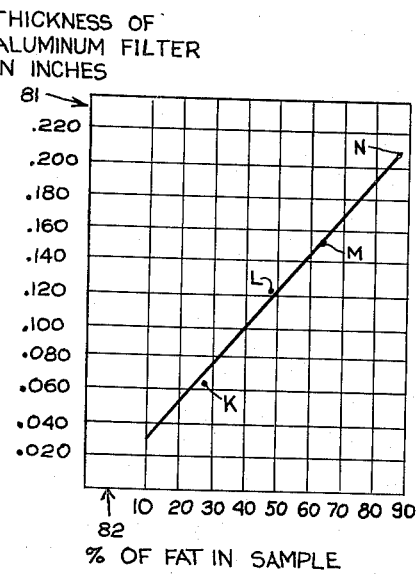
Figure 9:
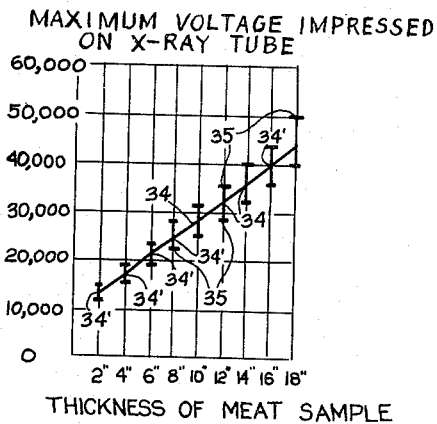

FIG. 4 shows in similar manner another apparatus by which my invention may be practiced, using an X-ray tube as a source of gamma rays, a Geiger-Müeller tube and a rate meter for measuring penetration, a flexible shaft for positioning the Geiger-Müeller tube a proper distance from the source of radiation and a ruler for measuring the distance said Geiger-Müeller tube is removed from the source of radiation;

FIG. 5 is a view similar to FIG. 1 with an added showing of the use of a series of filters for varying the intensity of the rays;

FIG. 6 is a graph, plotted upon a logarithmic grid, whose points were established from results obtained from tests made according to my method upon control samples of meat in which the quantitative relationship of lean-to-fat therein was known, showing the amount of penetration of gamma rays, measured in milliroentgens per hour, through samples varying in lean-to-fat ratio;

FIG. 7 is a graph plotted from results of experiments conducted in accordance with my method, in which the ray-measuring device was removed from the test sample that distance necessary to obtain a predetermined count on such ray-measuring device for control samples in which the quantitative relationship of the components vary;

FIG. 8 is a like graph, plotted from results of experiments conducted by my method, in which filters were used to absorb the gamma radiation until a standard count on a ray-measuring device for control samples was reached; and FIG. 9 is a graph showing the strength of gamma rays which produce the maximum total differential in penetration between lean and fat in meat samples of various thicknesses, and the range within which the strength of the gamma rays may vary to obtain differentials sufficiently great to allow the lean-to-fat ratio in meat samples to be easily determined.

In FIG. 1, the reference numeral 10 indicates a lead shield or housing within which is enclosed a source of gamma radiation, in this instance an X-ray tube 11, a sample container 12, which encloses a sample 13, and means for measuring the amount of gamma radiation penetrating through the sample 13, such as an ionization chamber, shown generally at 14, coupled in usual fashion with an electrometer 31.

In practice, power from a power source (not shown) would be conducted by wires 15 to a voltage regulator 16, which serves to control the power and eliminate fluctuations therein. The current so regulated is then conducted by means of wires 17 to a unit 18 containing transformer and voltage and amperage control equipment (not shown). The current which is thereby transformed and determined is then conducted by means of wires 19, which pass through holes 20 provided in the lead shield 10, to the X-ray tube 11, located in a radiation chamber 21, and energizes the tube in the ordinary manner, causing the tube to emit gamma rays.

The X-ray tube is equipped with a thin glass or beryllium window at the point 22 to permit the maximum usable amount of gamma rays to leave the tube 11.

A hole 23 is provided in an inner wall $23^1$ in the housing 10 directly beneath the window of the X-ray tube to allow passage of the gamma rays therethrough. The tube is supported by a bracket $11^1$ from said wall $23^1$.

Positioned beneath the hole 23 is the sample container 12, one wall of which is broken away to show the sample 13. The sample container 12 is, or may be, composed of tin-coated tubular steel walls 1/32 of an inch thick, having end closures composed of aluminum .005 of an inch thick, or plastic .25 of an inch thick. The height of the walls may vary for different materials and for gamma rays of different strength, as will hereinafter be more fully explained; and of course there may also be variations in the other dimensions above-mentioned.

The sample container 12 is supported above the ionization chamber 14 on an inner wall or shelf 24 in which there is a hole $24^1$ and on which a socket 25 is provided for receiving the container.

The gamma rays emitted from the X-ray tube 11 are thus caused to pass through the test sample 13 in the container 12 and thence to the ionization chamber 14.

The ionization chamber contains a filament 26 enclosed within walls 27. A battery 28, or some other source of power, provides electrical energy which is carried to the ionization chamber 14 by wires 29 which pass through holes 30 provided in the bottom of the housing 10. The polarity of the current so supplied is such as to cause the filament 26 and the walls 27 to carry opposite charges of electricity. The gamma rays upon entering the ionization chamber 14 cause the gas therein to ionize; thus, since the filament 26 and the walls 27 are oppositely charged, the positively charged ions are attracted to the negatively charged walls, the negatively charged ions are attracted to the positively charged filament and their charge is released into the circuit. An electrometer 31, wired into the circuit by means of wires 32, which pass through holes $32^1$ in the housing 10, measures the change in potential in the circuit, and thus the amount of penetration of gamma radiation through the sample 13.

It is generally agreed that X-rays and gamma rays are oscillations or waves in an electro-magnetic field, not having any mass. Still, in many respects, they act like units of matter, and are commonly called photons, or photons of energy. These X-rays and gamma rays are energy, and cannot be destroyed if directed into matter. They must, therefore, pass through the matter or be absorbed thereby, with some change in form.

Photons will give up their energy to matter in three principal ways, which are characterized as: the photo-electric effect, the Compton effect, and pair production effect.

The photo-electric effect, or photo-electric collision, occurs in the following manner: A gamma ray or photon strikes an electron in one of the orbits of an atom, dislodging it therefrom. Part of the energy of the ray is used up in dislodging the electron, and the rest of the energy is imparted to the electron to give it greater energy. The dislodged electron is called a photo-electron, and travels in a zig-zag path, forming ions when it comes in contact with other particles of matter. This is considered true absorption.

In the Compton effect, the gamma ray also strikes an electron in one of the orbits of an atom, dislodging said electron from its orbit. However, only part of the energy of the ray is used up, and the ray itself is deviated from its path by the collision. The ray proceeds along its new path with a reduced energy quantum. The dislodged electron is called a Compton or recoil electron. The process also is often called "scattering absorption."

In the pair production effect, the gamma ray or photon is annihilated in the vicinity of the nucleus of the absorbing atom with the subsequent production of an electron and positron pair. This reaction occurs only when the gamma ray has extremely high energy.

It is generally agreed that gamma rays of low energy give up their energy to matter, or are absorbed thereby, primarily by the photo-electric effect. As the strength of the gamma rays is increased, the Compton effect becomes more important, and finally as the gamma rays are further strengthened, the pair production effect provides most of the absorption.

In the practice of my method, gamma rays having a strength of approximately 50,000 electron volts or less, the range in which it is generally considered that the photo-electric effect is most important, are employed. It should be understood that in conducting many of the experiments which led to the instant invention, an X-ray tube was used as the source of gamma radiation. For this reason, the various strengths of the gamma rays employed are expressed herein in terms of the maximum voltage impressed upon the X-ray tube in order to produce said gamma rays. For example, the term "gamma rays having a strength of approximately 50,000 electron volts" is intended to denote that said rays are of that strength which will be produced by impressing a maximum voltage of 50,000 volts on an X-ray tube. Other sources of radiation such as isotopes can, of course, be utilized. Also, while the particular gamma rays employed in this invention are set forth herein and in the appended claims in terms of electron volts, it will readily be understood by those skilled in the art that such terms can be converted to other terminology such as to the wave length of the gamma rays expressed in Angstrom units.

No wholly satisfactory explanation of photo-electric absorption has been given, but it is generally agreed that absorption by the photo-electric effect is at some exponent of the atomic number of the element involved, while absorption by the Compton effect or by the pair production effect is, to a great extent, directly proportional to the atomic number of the elements involved. Thus, in the practice of my method, by using weak gamma rays, those of a strength of approximately 50,000 electron volts or less, which will be absorbed primarily by the photoelectric effect, the differences of absorption and penetration of these gamma rays as the components vary will be more pronounced in the samples than would be the case if gamma rays of greater strength, which would be absorbed by the Compton effect or the pair of production effect, were employed.

Stated differently, changes in the ratio of the components in a sample increases or decreases the average atomic number of the sample. If gamma rays of high energy are directed through the samples, the differences in absorption or penetration will be approximately proportional to the differences in the average atomic number of the sample. In the practice of my method, the same differences in the average atomic number of the sample will result in much larger differences in the amount of gamma rays absorbed by the sample, since the weak gamma rays used in the practice of the method will be absorbed by the sample in an exponential relation to the change in the average atomic number, rather than in proportional relation to the change in the atomic number, as is the case when stronger gamma rays are employed.

The foregoing theoretical explanation of gamma rays and their absorption tends to confirm, in part at least, the results which I have obtained by experiment in the practice of my invention. However, such results are not fully explained and in some respects are not indicated by the theories above set forth, but are based primarily on independent research and experimentation through which I have established the accuracy and utility of the method herein described and claimed.

It will, of course, be understood that gamma rays must be of sufficient strength to penetrate a sample; thus, since the mass, geometry and atomic composition of a sample will affect the amount of gamma ray absorption, the strength of the gamma rays employed will vary with the mass, geometry and atomic composition of the sample to be tested. Also, it has been found from experimentation that gamma radiation of a strength sufficient to penetrate a large sample may be so strong that when applied to a smaller sample the variation in the amount of absorption in samples in which the components vary in quantitative relationship are not sufficiently great to permit an accurate determination of the quantitative relationship of the components therein, as will be more fully described hereinafter.

Experiments have indicated that for any given size and weight of samples containing any given two components, there is a level of gamma radiation within a range of possibly 5,000 to 10,000 electron volts that results in maximum absolute differences in absorption and penetration of the sample. In general, these bands are close to the lowest energy of gamma rays that will give measurable penetration. Thus, if the minimum strength of radiation necessary to produce measurable penetration is determined for the sample most resistant to penetration, then the strength of the gamma rays employed should not exceed said minimum strength by substantially more than 10,000 electron volts. For example, assume that for a particular sample measurable penetration can be produced by applying a maximum voltage of 15,000 volts to the X-ray tube but that any decrease in said maximum voltage will result in a complete loss of measurable penetration. Then in such case the lowest energy of gamma rays which will give measurable penetration can be said to have a strength of 15,000 electron volts. Thus, the strength of gamma rays employed in testing said sample should be at least 15,000 electron volts but should not substantially exceed 25,000 electron volts and this is true even though other sources of radiation such as isotopes are employed.

For completeness and accuracy it should be pointed out that the use of gamma rays somewhat weaker than are herein indicated will give larger differences of absorption on a percentage basis, but the absolute differences are not large enough to be read accurately on the ordinary electrometer or rate meter, particularly where industrial demands necessitate the division of the total differential of absorption between those samples absorbing the greatest amount of gamma rays and those samples absorbing the least amount of gamma rays into a considerable number of increments in order that an accurate determination of the component ratio in any sample may be made.

The graph of FIG. 9 shows the strength of gamma rays to which meat samples of various thicknesses may be subjected to obtain the maximum absolute differential in penetration between predominantly lean and predominantly fat samples. The graph was prepared from the results of numerous experiments conducted on meat samples of various thicknesses.

The voltage applied to an X-ray tube to produce the greatest differential in penetration through samples varying in lean and fat content was recorded upon the graph with dots 34[1] on the lines representing samples of differing thicknesses. The dots were so graphed on the proper axis and were then connected with a plot line 34. Further experimentation was conducted upon the samples to determine for each thickness the parameter within which gamma rays produce the maximum absolute differential in penetration. These parameters, for different thicknesses, are indicated on the graph by lines 35. It can be seen from the graph of FIG. 9 that for a 2 inch meat sample the optimum strength of gamma radiation is approximately 14,000 electron volts, while for an 18 inch sample said optimum strength is approximately 44,000 electron volts. It will also be noted that the experimentally determined plot line 34 is substantially a straight line on an arithmetic grid. It follows that where the optimum strength of gamma radiation is known for the samples of two different thicknesses, said optimum strength for samples of intermediate thicknesses can be determined by linear interpolation. It can be seen from FIG. 9 that where meat is the product being tested the thickness of the samples should not substantially exceed 18 inches because such larger samples would require gamma rays of a strength substantially greater than 50,000 electron volts and absorption of such rays would not result in the desired differences in absorption as the components vary.

The following table shows the results of tests made upon a number of control meat samples all of which were 3.25 inches in diameter but which varied in height and in mass, when gamma rays of various strengths were caused to penetrate therethrough. Two samples of each size were employed, one of which contained 29.2% fat and the other containing 71.5% fat, to show the difference in the amount of penetration therethrough. The four inch samples weighed 600 grams, the eight inch samples weighed 1200 grams, the twelve inch samples weighed 1800 grams, and the eighteen inch samples weighed 2700 grams. The strength of the gamma rays is expressed as the voltage applied to an X-ray tube to produce them.

*Counts per minute through various samples*

| Kilovolts of electricity | 4 inch Samples | | 8 inch Samples | | 12 inch Samples | | 18 inch Samples | |
|---|---|---|---|---|---|---|---|---|
| | 29.2% | 71.5% | 29.2% | 71.5% | 29.2% | 71.5% | 29.2% | 71.5% |
| 14 | 60 | 1,250 | | | | | | |
| 15 | 345 | 1,600 | | | | | | |
| 16 | 650 | 5,300 | | | | | | |
| 17 | 1,000 | 8,000 | | | | | | |
| 18 | 3,100 | 10,100 | | | | | | |
| 20 | | | 85 | 400 | | | | |
| 21 | | | 245 | 1,080 | | | | |
| 22 | | | 460 | 2,600 | | | | |
| 23 | | | 600 | 4,100 | 370 | 900 | | |
| 24 | | | 1,140 | 6,500 | | | | |
| 25 | | | 3,450 | 8,000 | 1,150 | 2,500 | | |
| 26 | | | | | 2,600 | 4,200 | | |
| 28 | | | | | 4,350 | 7,200 | | |
| 30 | | | | | 7,200 | 9,300 | 250 | 760 |
| 32 | | | | | 9,300 | 11,700 | 400 | 1,100 |
| 34 | | | | | | | 630 | 1,600 |
| 36 | | | | | | | 870 | 2,300 |
| 38 | | | | | | | 1,320 | 3,100 |
| 40 | | | | | | | 1,750 | 4,000 |
| 42 | | | | | | | 2,250 | 4,600 |
| 44 | | | | | | | 2,600 | 6,000 |
| 46 | | | | | | | 3,200 | 7,000 |
| 48 | | | | | | | 3,600 | 7,800 |
| 50 | | | | | | | 4,300 | 8,700 |
| 54 | | | | | | | 6,000 | 10,200 |

The difference in the amount of penetration between lean meat and fat meat, as shown in the above chart, can perhaps be explained in part (but, as above pointed out, not entirely) by the fact that although lean meat and fat meat are primarily composed of nitrogen, oxygen, hydrogen and carbon, lean meat has a higher percentage of nitrogen and oxygen than fat meat. Nitrogen and oxygen have higher atomic numbers than carbon and hydrogen and, therefore, have higher co-efficients of photoelectric absorption. Lean meat, therefore, absorbs gamma radiation to a far greater extent than would fat meat when the gamma rays to which lean and fat are exposed are within that range of strength wherein the rays give up their energy to matter by photo-electric collision.

It should be noted that many of the materials referred to earlier herein such as milk, soybeans, and cottonseeds are similar to meat in that they have two major components, one having a high total percentage of nitrogen and oxygen (as does lean) and the other having a high total percentage of carbon and hydrogen (as does fat). The applicability of the instant invention to these materials can thus be explained in part for the reasons stated above with respect to meat.

In FIG. 1, if a meat sample 7 inches in thickness were to be tested, a proper voltage to be applied to the X-ray tube would be on the order of 23,000 volts, as indicated by the experimentation on which FIG. 9 was based. Control samples of meat, each weighing 12 pounds, would be placed in sample containers 12 to assure uniform geometry thereof. The lean-to-fat ratio in each of the control samples would be known, and each would vary from the other. Enough control samples would be prepared, so as to cover a broad range of, say, from 10% fat to approximately 90% fat.

Each control sample 13 would be exposed to the gamma rays, and the amount of penetration therethrough would be recorded. A chemical analysis of the sample would be made and the percentage of fat therein would also be recorded. Over 150 such control samples were thus handled as a basis for determining a line identified by the numeral 33 in FIG. 6. A few typical control samples which are plotted on the graph of said FIG. 6 as heavy dots A–H inclusive are shown below:

| Control sample | Percent of fat determined by chemical analysis | Gamma ray penetration in milliroentgens per hour |
| --- | --- | --- |
| A | 11.0 | 12.2 |
| B | 21.1 | 17.6 |
| C | 22.2 | 20.3 |
| D | 47.5 | 43.5 |
| E | 55.0 | 59.0 |
| F | 75.8 | 116.0 |
| G | 79.9 | 134.0 |
| H | 87.8 | 169.0 |

Although in this instance the plot line 33 is a straight line on a logarithmic grid, it should be understood that under different circumstances, using a different product to be tested, different strength of radiation, or different size control samples, the plot line 33 might be irregular. The important thing is that the plot line be accurately determined from a sufficiently large number of known control samples at all levels of component ratios at which unknown samples are to be determined. After the line is accurately determined, a table may be prepared from it if desired for convenience in use.

Having in this manner determined the amount of penetration in control samples, a test sample was prepared of meat with an unknown percentage of fat. Exactly 12 pounds were placed in the sample container and gamma rays were passed through in the same manner as for the control samples. The penetration was measured as 18.0 milliroentgens per hour. When the horizontal line at 18.0 milliroentgens per hour on FIG. 6 was followed over to the plot line 33, the vertical line crossing it at that point indicated that the percentage of fat in the sample was 22.0%. A careful chemical analysis was then made of the meat and this showed that the percentage of fat was 21.9%.

A second unknown sample handled in the same way showed penetration of 72.3 milliroentgens per hour. By referring to the chart on FIG. 6, the fat content was indicated to be 64.0%. Careful chemical analysis of the meat showed the fat content thereof to be 63.8%.

Thus, in this manner, the fat percentage in any unknown sample of meat comparable to that in the control samples can be determined.

It should be understood that different products vary in their absorption qualities of gamma rays. This is demonstrated by the following chart which was prepared from results of my experiments:

*Counts per minute as measured by Geiger-Müeller tube and rate meter*

[All samples 6.5 inches thick]

| Voltage on X-ray tube in kilovolts | Blood meal | Tankage | Bone meal |
| --- | --- | --- | --- |
| 20 | 75 | | |
| 24 | 350 | 50 | |
| 28 | 1,300 | 100 | |
| 30 | 2,500 | 160 | |
| 34 | 6,000 | 800 | 100 |
| 38 | 10,000 | 1,460 | 500 |
| 44 | | 8,700 | 4,300 |
| 48 | | 11,000 | 9,600 |

1 M. M. COPPER FILTER USED TO REDUCE COUNTS TO A REGISTRABLE NUMBER

| | | | |
| --- | --- | --- | --- |
| 30 | 250 | | |
| 34 | 1,600 | 160 | |
| 38 | 3,500 | 1,050 | 150 |
| 40 | 7,500 | 2,400 | 550 |
| 42 | 9,300 | 3,700 | 1,350 |
| 44 | 10,800 | 6,000 | 3,000 |

In testing products of the character above described, gamma rays of a strength substantially in excess of 50,000 electron-volts produced results in which the amount of difference in the penetration was so small as to restrict their usefulness. It is, of course, possible that some materials not as yet tested, because of their particular atomic structure, might have sufficient differences in absorption at gamma ray strength substantially above 50,000 electron volts to permit the use of such higher voltage in my method.

In FIG. 2 a device is depicted which, for example, might be used in testing tankage. In this embodiment of the invention, a lead shield 36 encloses a source of radiation, such as an isotope 37, said isotope being placed in a radiation chamber 38 formed in the shield 36. Beneath said isotope is a hole 39, in a bottom wall 38¹ of said chamber, to allow gamma rays to pass therethrough. A sample container 40, in which a sample 41 is enclosed, is centered upon a plate 42, at the upper end of a shaft or spindle 43, which is arranged to be driven by a motor 44. Said motor 44 is supplied with current from a power source (not shown) through wires 45 which pass through holes 46 in the bottom on the shield 36.

A Geiger-Müeller tube 47 is positioned beneath the sample container 40 and within the effective cone of gamma radiation of the isotope 37. The tube 47 is equipped with a mica window at the point 48 to allow the gamma rays to pass therethrough, and is connected to a rate meter 49 by wires 50 which pass through holes 51 in the shield 36. Power is supplied to the rate meter 49 by wires 52 from a power source (not shown).

In this instance, the sample container 40 could be, for example, 8 inches in diameter and 3 inches in height and composed of aluminum, the walls being 1/32 of an inch thick and the end closures .005 of an inch thick.

Samples of tankage weighing, say, 2,500 grams could be placed therein.

The isotope 37 may be either natural or pile-produced, so long as the strength of the gamma rays emitted therefrom is sufficient to measurably penetrate the sample, yet not in excess of approximately 50,000 electron volts. At present I am aware of only a few isotopes which give off primarily gamma rays having an energy of less than 50,000 electron volts. Three of these are lead 210 which gives off primarily gamma rays of an energy of 47,000 electron volts, tin 113 which gives off primarily gamma rays of an energy of 39,000 electron volts and actinium 227 which gives off primarily gamma rays of an energy of 37,000 electron volts. Any of such isotopes, or others of like nature if available, might properly be used with a given sample having the right mass and geometry.

Since tankage contains two minor components, grease and moisture, which can usually be easily removed, or the percentage of each of them in the mixture independently determined, it is advisable to adjust all samples of tankage to contain, for example, 5% moisture and 10% grease. Since the percentages of moisture and grease, respectively, normally found in tankage are close to these percentages, it is easier to adjust the moisture and grease in tankage to the percentages set forth above than to any other arbitrary percentages. The major components in tankage are protein, bone and ash. The relationship of such major components may be determined by my method after the minor components therein have been removed, or adjusted to the above-mentioned standards.

The sample 41 is placed in the container 40. The motor 44 causes the container 40 to rotate at, say, 6 r.p.m. As thus illustrated, the same amount of the sample 41 is within the cone of radiation of the isotope 37 at all times during rotation of the container.

The Geiger-Müeller tube 47 is activated by the gamma rays penetrating through the sample 41, and the rate meter 49 records the amount of penetration.

After control samples have been tested and the penetration therethrough recorded, a test sample is exposed, and by measuring the amount of penetration therethrough and comparing it to results from the control samples, the amount of protein therein may be determined in the same manner as was the amount of fat in the meat samples.

FIG. 3 depicts a device which, for example, might be used for determining the quantitative relationship of oil to non-oil substances in soy beans. Since the moisture varies slightly in soy beans, it will be removed or brought to the same level in all samples tested.

In this embodiment, a lead shield 55 has a radiation chamber 56 formed therein for housing an isotope 57 which is situated therein over a hole 58 in the bottom wall of said chamber, provided for allowing gamma rays emitted from the isotope 57 to pass therethrough. Beneath the hole 58 is situated a sample container 59 which encloses a sample 60 of the soy beans. The sample container 59 rests in a socket 61 situated around the periphery of a hole 62 in a transverse wall 62¹ in the housing 55, beneath which hole there is a scintillation crystal 63, which is caused to glow when exposed to the gamma rays. Positioned directly beneath the scintillation crystal 63 is a photo-multiplier tube 64, to which light from the crystal 63 is transmitted. The light so transmitted to the tube 64 creates electrical impulses therein which are transmitted to a scaler 65 by wires 66 which pass through holes 67 in the bottom of the shield 55. The scaler 65 measures the amount of radiation penetrating the sample 60 and transmitted to the crystal 63. Said scaler is supplied with electricity from a source (not shown) by wires 68.

The weight of the sample 60 enclosed in container 59 could be, say, 350 grams. The isotope 57, like the isotope 37 in FIG. 2, could be natural or pile-produced, so long as the gamma rays emitted therefrom were sufficient to penetrate the sample 60 and within the voltage range of rays which would be absorbed by the sample largely by photoelectric collision.

Control samples may be prepared and tested in the manner previously described, and from the results so obtained, the quantitative relationship of oil to non-oil components in a sample of soy beans may be determined by measuring the amount of gamma ray penetration through the test samples and comparing it to the amount of penetration through the control samples, as hereinbefore described.

It is possible to practice the embodiment of my invention shown in FIG. 1 in other ways than that previously described. For example, instead of supplying a constant amount of current to the X-ray tube 11 and measuring the varying amount of penetration through the samples 13, the current supplied to the tube 11 may be varied as required for a given amount of penetration such as 10 milliroentgens per hour as determined by recorded results with a control sample of known composition. If the varying amount of current supplied to the control samples were plotted, the plot line formed would be similar to the plot line 33 in FIG. 6. When a test sample 13 is exposed to the gamma rays, the amount of electric current necessarily applied to the X-ray tube 11 in order to obtain a reading of 10 milliroentgens per hour on the electrometer 31 may be noted, and by comparing the amount of current with that necessary on the control samples, the component relationship in the test sample 13 may be determined.

In FIG. 4 I have depicted a device that might also be used in the practice of my invention to determine, for example, the relationship of lean and fat in meat samples. In this embodiment, a lead shield 69 encloses an X-ray tube 70, supported by a bracket 70¹, a sample container 71, in which a sample 72 may be placed, centered by a socket 73 on an apertured transverse wall 73¹, and a Geiger-Müeller tube 74 slidably engaged in tracks 75 and supported on a flexible shaft or semi-rigid cable 76. The shaft or cable 76 is disposed between guide rollers 77 and supporting rollers 77¹ and carries a pointer 76¹ at its free end disposed alongside a measuring ruler 78, so that the exact distance of the Geiger-Müeller tube 74 from X-ray tube 70 may be read on said ruler 78 at all times.

The shaft or cable 76 is sufficiently rigid so that it will support the Geiger-Müeller tube 74 at any desired height in the tracks 75.

Electricity from a source not shown will be conducted through wires 79 to a voltage regulator 80 and thence through wires 81 to a unit 82 containing a transformer and a voltage and amperage control device. In this case a very closely controlled amount of electric current, which might be, for example, of a voltage of 22 kilovolts and an amperage of 3 milliamperes, will be conducted by wires 83, which pass through holes 84 in the shield 69, to the X-ray tube 70. Gamma rays created by the energization of the tube 70 will penetrate the sample 72 and be detected by the tube 74.

The control and test samples of meat, all packed in the same type of container described above, may, for example, be 6 inches thick and weigh 900 grams.

The control samples, each varying from the other in the known percentages of lean and fat, will be placed in the socket 73 and Geiger-Müeller tube 74 will be moved along the tracks 75 until a reading of, say 1000 counts per minute is secured on a rate meter 85, which is connected to a Geiger-Müeller tube 74 by wires 86 and which receives electrical current from a source (not shown) through wires 87.

The exact distance of Geiger-Müeller tube 74 from the X-ray tube 70 for each control sample may be recorded on a graph such as that shown in FIG. 7, wherein the vertical axis 88 of the graph reflects the distance in inches of the ray-detecting device (Geiger-Müeller tube) from the source of rays and the horizontal axis 89 reflects the percent of fat in the sample. After the results are plotted on the graph the points are connected by a plot line 90.

After said graph is prepared from results of known control samples, a test sample is placed in the apparatus and the ray-detecting device is moved away from the ray source such distance as is necessary to give exactly the predetermined reading of 1000 counts per minute. From the graph it is then possible to determine the fat percentage in the sample by observing which control sample had to be moved a like distance to obtain the predetermined reading.

It should be understood that when practicing my method of correlating the distance the gamma ray-detecting device must be removed from the test sample in order to obtain a predetermined count with the distance that a particular control sample had to be moved to obtain such count, several factors in addition to the ratio of components in the samples will influence the distance the device must be moved. Attenuation of the quantity of the rays by increased distance, and absorption of the gamma rays by the column of air interposed, are certainly two of these factors. Since all of these factors are present and determine the distance the detecting device must be moved when the control samples are tested, they will be present and will have the same effect when the test samples are tested.

The plot line 90 on the graph in FIG. 7 is the result of charting points determined by experiments conducted on six-inch samples of pork trimmings. The predetermined count was 1000 per minute; the gamma rays were of a strength of 22,000 electron volts. The plot line 91 is the result of graphing results conducted on two-inch samples, the gamma rays being of a strength of 15,000 electron volts, and the predetermined count 3,500 per minute.

FIG. 5, which is basically similar to FIG. 1, depicts another scheme which may be used in the practice of my invention. In this embodiment I employ a variable number of filters 92 made of aluminum or other suitable material positioned in a filter rack 93 resting in a socket 94 on a horizontal wall or shelf 95 having a central opening 96 therein. Said filters are thus placed between the X-ray tube 11 and the sample container 12.

It is known that if filters are interposed between a source of gamma rays and a measuring device, the strength of the rays will be reduced, not in direct relation to the thickness of the filters, but exponentially, depending upon the coefficient of absorption of the material in the filters. Thus, if the amount of gamma radiation is maintained at a constant, and filters are interposed between the source of the gamma rays and the sample, the quantitative relationship of the components may be determined in a manner hereinafter more fully explained.

If, for example, the device of FIG. 5 were used to determine the lean-to-fat ratio in meat trimmings, the samples of which were of the same size and geometry as those in FIG. 1, aluminum filters up to a total thickness of .225 of an inch might properly be used to vary the strength of the gamma rays, and a uniform or standard amount of gamma ray penetration, for example 10 milliroentgens per hour through each sample, could be obtained by interposing the proper number of filters between the X-ray tube and the sample to bring about this amount of penetration.

It is possible, regardless of the care exercised, for the strength of the gamma rays emitted from the tube 11 to vary due to fluctuations in the amount of electrical energy supplied thereto. Since such fluctuations would cause inaccuracy in my method, it is advisable to have some element, the penetration through which is known to be at a certain level when gamma rays of the proper strength are being emitted from the tube 11, that may be subjected to radiation from time to time in order to assure accuracy in my testing methods.

For example, when an aluminum filter of .6253 of an inch in thickness, was placed in the filter holder 93 with no meat sample in place, the penetration was read at precisely 10 milliroentgens per hour on the electrometer 31. This was used as a standard against which to check the stability and reproducibility of the measurements before and after each control or test sample was measured. Deviations from standard indicating minor variations in the strength of radiation were corrected by slight changes in the voltage on the X-ray tube.

Over 150 control samples of meat were prepared, analyzed chemically, and the thickness of filters necessary to hold penetration to precisely 10 milliroentgens per hour determined. A few typical cases are shown below and plotted as heavy dots K–N on the graph of FIG. 8.

| Control sample | Percent of fat by chemical analysis | Thickness of aluminum filter in inches necessary to hold penetration to 10 m./r. per hour |
| --- | --- | --- |
| K | 26.0 | .065 |
| L | 47.5 | .122 |
| M | 63.5 | .153 |
| N | 87.0 | .210 |

The line shown on said FIG. 8 is considered most representative of all the control samples. It need not be a straight line on an arithmetic grid as is shown, but must be based on sufficient control samples at all levels of component ratios where unknown samples are to be analyzed. Once determined, the line of relationship can be shown on a chart, or expressed in tabular form.

A test sample 13 with an unknown percentage of fat was prepared, exactly 12 pounds thereof was placed in the sample container 12, and handled the same as the control samples. Before and after the reading, the apparatus was checked to make certain that penetration through the standard .6253 inch of aluminum was exactly 10 milliroentgens per hour.

Through the unknown test sample, the penetration was precisely 10 milliroentgens per hour when exactly .126 inch of aluminum filter was used. By reference to the graph of FIG. 8, this thickness of filter corresponds to 51.3% of fat. Careful chemical analysis of this sample indicated the fat content at 51.6%.

A second unknown test sample was similarly processed and .211 inch of aluminum filter was necessary to hold the penetration to 10 milliroentgens per hour. Reference to the graph of FIG. 8 indicated this to correspond with a fat content of 88.0%. Chemical analysis revealed the fat content of the sample to be 87.8%.

Since certain changes can be made in the procedure above described without departing from the spirit or scope of the invention, it is intended that the disclosures herein shall be interpreted as illustrative and not in a limiting sense.

I claim:
1. A method for determining the quantitative relationship of components in a product composed chiefly of two components, each of which is uniform and varying from the other in atomic structure, by means of gamma rays, comprising exposing control samples of a product to be tested to gamma rays of a strength not substantially in excess of 50,000 electron volts emitted from an X-ray tube, measuring the amount of gamma ray penetration through said control samples, varying the voltage applied to the X-ray tube to produce a uniform amount of penetration through each sample, measuring and recording the voltage necessarily supplied to the

X-ray tube to produce such uniform amount of penetration through the several control samples, exposing a test sample to gamma rays sufficiently strong to cause the same amount of penetration therethrough as was obtained with the control samples, and measuring the voltage necessarily supplied to the X-ray tube to obtain such penetration through the test sample, whereby the voltage applied to obtain the penetration through the test sample may be compared to the voltages applied to obtain penetration through the control samples, to determine the quantitative relationship of the components in the test sample.

2. A method for determining the quantitative relationship of components in a product composed chiefly of two components, each of which is uniform and varying from the other in atomic structure, by means of gamma rays, comprising exposing control samples of a product to be tested, in which samples the quantitative relationship of the components is known, to gamma rays, measuring the amount of gamma ray penetration through each of such samples by placing a measuring device in the path of those rays which have penetrated a sample and moving said device in the direction of said path a sufficient distance from said sample so as to obtain a predetermined reading on said device, recording such distances for the several control samples, exposing a test sample which is of the same thickness as said control samples to gamma rays of a strength equal to that to which the control samples were exposed, and determining by similar means the distance which must separate the measuring device and the test sample in order to obtain said predetermined reading on said device whereby the distance corresponding to the test sample may be compared to the distances corresponding to the control samples to determine the quantitative component relationship of said test sample.

3. A method for determining the quantitative relationship of components in a product composed chiefly of two components, each of which is uniform and varying from the other in atomic structure, by means of gamma rays, comprising exposing control samples of a product to be tested, in which samples the quantitative relationship of the components is known, to gamma rays, measuring on a ray-measuring device by the use of filters the gamma ray penetration through each control sample by progressively inserting filters between the gamma ray source and the sample until a sufficient total filter thickness is inserted to secure a predetermined reading on the ray-measuring device, recording the thickness of the filters necessarily used on each control sample to secure such predetermined reading, exposing a test sample of the material to be tested to gamma rays of a strength equal to that to which the control samples were exposed, measuring the amount of gamma ray penetration therethrough by progressively inserting filters between the gamma ray source and the test sample until a sufficient total thickness of such filters is inserted to secure such predetermined reading on the ray-measuring device, and observing which of the control samples required the use of a like amount of filter thickness to obtain said predetermined reading, the quantitative component relationship of the test sample being thus determined to be the same as the known relationship of such control sample.

4. Apparatus for determining the quantitative relationship of components in a product composed chiefly of two components, each of which is uniform and varying from the other in atomic structure, by means of gamma rays, comprising a ray-confining housing, a source of gamma rays enclosed within said housing, means located within said housing for supporting the sample container in operative relationship to said source of gamma rays, tracks located within said housing beneath said supporting means, a ray-detecting device slidably mounted upon said tracks, a movable flexible but semirigid shaft supporting said ray-detecting device for movement in said tracks, a pointer on said shaft, a ruler along which said pointer is movable for indicating the distance that the ray-detecting device has been moved along said tracks away from the sample container, a ray-measuring device, and means for electrically connecting said ray-detecting device with said ray-measuring device to cause the latter to measure the amount of ray penetration through a sample in said container, as detected by said ray-detecting device.

5. A method for determining the relative amounts of fat and lean in meat which consists in preparing control samples of said meat which are of uniform thickness, the uniform thickness of said control samples being between approximately 2 inches and 18 inches; exposing said control samples to gamma rays of a strength which does not vary by substantially more than 7500 electron volts from the optimum strength corresponding to said uniform thickness of said control samples, said optimum strength being approximately 14,000 electron volts for control samples of the minimum 2 inch thickness, approximately 44,000 electron volts for control samples of the maximum 18 inch thickness, and being determinable for control samples of intermediate thicknesses by linear interpolation; measuring and recording the amount of gamma ray penetration through such control samples; exposing a test sample which is of the same thickness as said control samples to gamma rays of the same strength as those to which the control samples were exposed; and measuring the amount of gamma ray penetration through said test sample whereby the amount of gamma ray penetration through the test sample may be compared to the penetration through the control samples to determine the relative amounts of fat and lean in the test sample.

6. A method for determining the relative amounts of fat and lean in meat which consists in preparing control samples of said meat which are uniform in thickness; exposing said control samples to gamma rays of a strength which does not exceed the minimum strength necessary to produce measurable penetration of that control sample having the least fat therein by substantially more than 10,000 electron volts and which in any event does not substantially exceed a total strength of 50,000 electron volts; measuring and recording the amount of gamma ray penetration through such control samples; exposing a test sample which is of the same thickness as said control samples to gamma rays of the same strength as those to which the control samples were exposed; and measuring the amount of gamma ray penetration through said test sample whereby the amount of gamma ray penetration through the test sample may be compared to the penetration through the control samples to determine the relative amounts of fat and lean in said test sample.

7. A method for determining the relative amounts of fat and lean in meat which consists in preparing control samples of said meat which are uniform in mass and geometry, the uniform thickness of said control samples being between approximately 2 inches and 18 inches; exposing said control samples to gamma rays of a strength which does not vary by substantially more than 7500 electron volts from the optimum strength corresponding to said uniform thickness of said control samples, said optimum strength being approximately 14,000 electron volts for control samples of the minimum 2 inch thickness, approximately 44,000 electron volts for control samples of the maximum 18 inch thickness, and being determinable for control samples of intermediate thicknesses by linear interpolation; measuring and recording the amount of gamma ray penetration through such control samples; exposing a test sample which is similar to the control samples in mass and geometry to gamma rays of the same strength as those to which the control samples were exposed; and measuring the amount of gamma ray penetration through the test sample whereby the amount of gamma ray penetration through the test sample may be compared to the penetration through the control samples to determine the relative amounts of fat and lean in said test sample.

8. A method for determining the relative amounts of fat and lean in meat which consists in preparing control samples of said meat which are uniform in mass and geometry; exposing said control samples to gamma rays of a strength which does not exceed the minimum strength necessary to produce measurable penetration of that control sample having the least fat therein by substantially more than 10,000 electron volts and which in any event does not substantially exceed a total strength of 50,000 electron volts; measuring and recording the amount of gamma ray penetration through such control samples; exposing a test sample which is similar to the control samples in mass and geometry to gamma rays of the same strength as those to which the control samples were exposed; and measuring the amount of gamma ray penetration through the test sample whereby the amount of gamma ray penetration through said test sample may be compared to the penetration through the control samples to determine the relative amounts of fat and lean in said test sample.

9. A method for determining the relative amounts of fat and lean in meat which consists in preparing control samples of said meat which are of uniform thickness, the uniform thickness of said control samples being between approximately 2 inches and 18 inches; exposing said control samples to gamma rays of a strength which does not vary by substantially more than 7500 electron volts from the optimum strength corresponding to said uniform thickness of said control samples, said optimum strength being approximately 14,000 electron volts for control samples of the minimum 2 inch thickness, approximately 44,000 electron volts for control samples of the maximum 18 inck thickness, and being determinable for control samples of intermediate thicknesses by linear interpolation; measuring the amount of gamma ray penetration through each of such samples by placing a measuring device in the path of those rays which have penetrated a sample and moving said device in the direction of said path a sufficient distance from said sample so as to obtain a predetermined reading on said device; recording such distance for the several control samples; exposing a test sample which is of the same thickness as said control samples to gamma rays of a strength equal to that to which the control samples were exposed; and determining by similar means the distance which must separate the measuring device and the test sample in order to obtain said predetermined reading on said device, whereby the distance corresponding to the test sample may be compared to the distances corresponding to the control samples to determine the relative amounts of fat and lean in said test sample.

10. A method for determining the relative amounts of fat and lean in meat which consists in preparing control samples of said meat which are of uniform thickness, the uniform thickness of said control samples being between approximately 2 inches and 18 inches; exposing said control samples to gamma rays of a strength which does not vary by substantially more than 7500 electron volts from the optimum strength corresponding to said uniform thickness of said control samples, said optimum strength being approximately 14,000 electron volts for control samples of the minimum 2 inch thickness, approximately 44,000 electron volts for control samples of the maximum 18 inch thickness, and being determinable for control samples of intermediate thicknesses by linear interpolation; measuring on a ray-measuring device, by the use of filters, the gamma ray penetration through each control sample by progressively inserting filters between the gamma ray source and the sample until a sufficient total filter thickness is inserted to secure a predetermined reading on the ray-measuring device; recording the thickness of the filters necessarily used on each control sample to secure such predetermined reading; exposing a test sample which is of the same thickness as said control samples to gamma rays of a strength equal to that to which the control samples were exposed; and determining by similar means the thickness of filters necessary to obtain said predetermined reading, whereby the filter thickness corresponding to said test sample may be compared to the filter thicknesses corresponding to the various control samples to determine the relative amounts of fat and lean in the test sample.

11. Apparatus for determining the quantitative relationship of components in a product composed chiefly of two components, each of which is uniform and varying from the other in atomic structure, comprising: a ray-confining housing; a source of gamma rays enclosed within said housing; means located within said housing for supporting a sample container in operative relationship to said source of gamma rays; a ray-measuring device mounted in the path of the rays which have penetrated said sample, said device being mounted for movement in the direction of said path to permit variation of the distance between said device and said sample container; means for indicating the distance between said device and said sample container for all positions of said device; and means for moving said ray-measuring device in the direction of said path so as to permit adjustment of the amount of gamma ray penetration recorded on said ray-measuring device to a predetermined amount.

12. A method for determining the quantitative relationship of components in materials taken from the group consisting of organic materials composed chiefly of two organic components wherein one of said components is essentially protein and has a total percentage by weight of oxygen and nitrogen in excess of approximately 50% and wherein the other of said components is essentially a hydrocarbon and has a total percentage by weight of carbon and hydrogen in excess of approximately 50% and products produced by processing said organic materials, which method consists in preparing control samples of the product to be tested, said samples being uniform in thickness; exposing said control samples to gamma rays of a strength which does not exceed by substantially more than 10,000 electron volts the minimum strength necessary to produce measurable penetration of that control sample which is most resistant to gamma ray penetration and which in any event does not substantially exceed a total strength of 50,000 electron volts; measuring and recording the amount of gamma ray penetration through such control samples; exposing a test sample which is of the same thickness as said control samples to gamma rays of the same strength as those to which the control samples were exposed; and measuring the amount of gamma ray penetration through the test sample whereby the amount of gamma ray penetration through the test sample may be compared to the penetration through the control samples to determine the quantitative relationship of said two components in said test sample.

13. A method of the type set forth in claim 12 where the organic material is cottonseeds and where one of said two components comprises the oil substances in cottonseeds and the other of said components comprises the non-oil substances in cottonseeds.

14. A method of the type set forth in claim 12 where the organic material is milk and where one of said two components comprises butterfat and the other of said components comprises the remaining ingredients in milk.

15. A method of the type set forth in claim 12 where the organic material is soybeans and where one of said two components comprises the oil substances in soybeans and the other of said components comprises the non-oil substances in soybeans.

(References on following page)

References Cited in the file of this patent

UNITED STATES PATENTS

| | | |
|---|---|---|
| 1,605,395 | de Ybarrondo | Nov. 2, 1926 |
| 2,462,270 | Lipson | Feb. 22, 1949 |
| 2,540,261 | Herzog | Feb. 6, 1951 |
| 2,597,535 | Segre | May 20, 1952 |
| 2,748,290 | Reichertz | May 29, 1956 |
| 2,783,387 | Howell | Feb. 26, 1957 |
| 2,828,422 | Steierman | Mar. 25, 1958 |
| 2,861,188 | Dijkstra | Nov. 18, 1958 |

OTHER REFERENCES

Liebhafsky et al.: "Chemical Analysis by X-ray Absorption," General Electric Review, April 1945, pp. 36 to 39.

Daggs: "Portable Isotopic X-ray Units," Peaceful Uses of Atomic Energy, vol. 15, published by the United Nations, 1956, page 174.